(No Model.)
M. GLASSBROOK & N. EMMER.
POWER MACHINE.
No. 446,862. Patented Feb. 24, 1891.
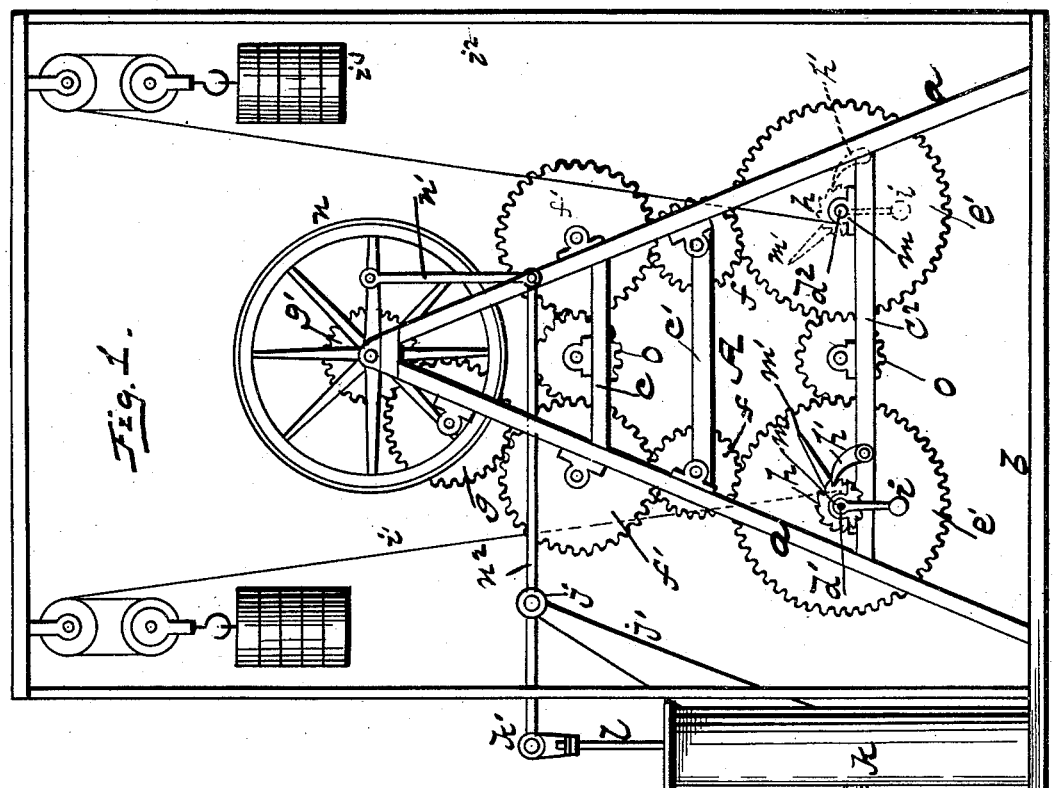
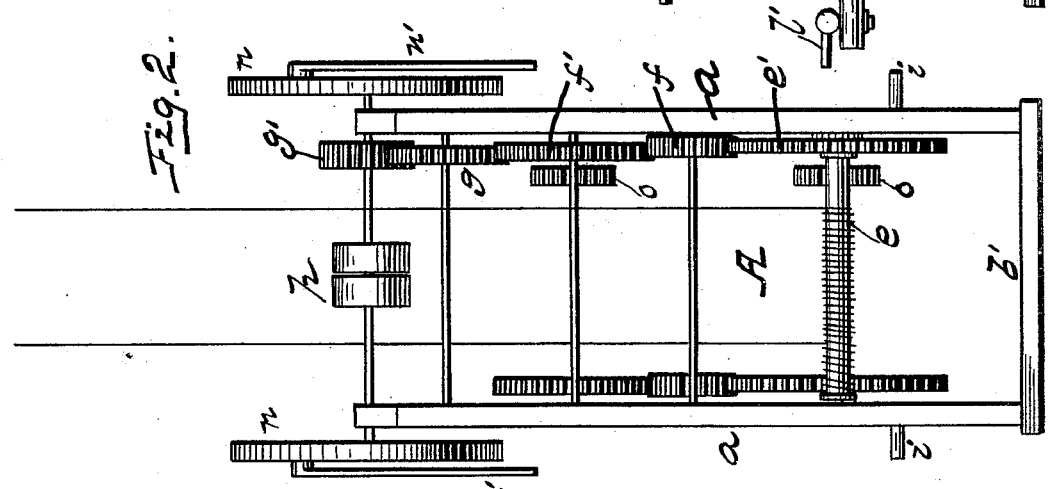
WITNESSES
Jas. B. Clarke
M. M. Martin
INVENTORS
M. Glassbrook
N. Emmer
by E. H. Bates Attorney

UNITED STATES PATENT OFFICE.

MYRON GLASSBROOK AND NICHOLAS EMMER, OF WILLIAMSTON, MICHIGAN.

POWER-MACHINE.

SPECIFICATION forming part of Letters Patent No. 446,862, dated February 24, 1891.

Application filed October 30, 1890. Serial No. 369,769. (No model.)

*To all whom it may concern:*

Be it known that we, MYRON GLASSBROOK and NICHOLAS EMMER, citizens of the United States, residing at Williamston, in the county of Ingham and State of Michigan, have invented certain new and useful Improvements in Power-Machines; and we do hereby declare the following to be a full, clear, and exact description of the invention, such as will enable others skilled in the art to which it appertains to make and use the same.

This invention has relation to improvements in power-machines; and it consists in the novel construction and arrangement of the parts, all of which will be hereinafter fully described.

The annexed drawings, to which reference is made, fully illustrate our invention, in which—

Figure 1 represents a side view of our improved power-machine. Fig. 2 is an end view of the same, and Fig. 3 is a detail view.

Referring by letter to the accompanying drawings, A designates the main frame of the machine, which consists of the side bars $a\,a$, which are inclined upwardly and inwardly, coming together at the top, as shown in Fig. 1 of the drawings. These inclined side bars rest upon a base-bar $b$ and are connected to one another by the horizontal bars $c\,c'\,c^2$, and a transverse base-bar $b'$ connects the two sides, as shown.

The frame above described is designed to support the power mechanism composed of shafts, gearing, fly-wheel, pitman, and lever. On the lower horizontal bars of the frame are journaled two transverse shafts $d'\,d^2$, upon each of which is arranged a drum or windlass $e$, to which latter are secured large gear-wheels $e'\,e''$, which engage small gear-wheels $f\,f$, which latter in turn mesh with gear-wheels $f'\,f'$, while one of the latter engages a gear-wheel $g$, which in turn meshes with a small gear-wheel $g'$ at the top of the frame, and said wheels being secured to transverse shafts, thus forming a train of gearing from the top to the bottom of the frame aforesaid. The lower or large gear-wheels are provided with ratchet-wheels $h\,h$, which engage pawls $h'\,h'$, pivoted to the frame, and crank-handles $i\,i$ are attached to the transverse shafts, whereby the drums are turned in winding the ropes $i'$, which ropes pass over pulleys on a frame $i^2$ and have weights $i^3$ suspended therefrom.

To the outer end of the top transverse shaft is secured a fly-wheel $n$, to which is pivoted the upper end of a pitman $n'$, the lower end of which is pivoted to one end of a lever $n^2$, which latter in turn is pivoted at $j$ to a standard $j'$, secured to the pump $k$. The outer end $k'$ of said lever is pivoted to the plunger-rod $l$ of said pump, and a shut-off cock $l'$ is attached to the spout thereof, for a purpose presently explained.

The main lower gear-wheel shafts are journaled in boxes $m\,m$, and the ratchet-wheels are provided with a hand-lever $m'$, whereby said ratchets can be readily thrown in and out of gear with the pawl when it is desired to start the machine in motion.

It will be seen that when only sufficient power is required for pumping or running light machinery one train of wheels only is set in motion by releasing the ratchet and disengaging the two intermediate gear-wheels $o\,o$, when the weight descends, thus turning the windlass, carrying with it the large lower gear-wheel, and in turn revolving the train, thereby revolving the fly-wheel and operating the pitman, and through the medium of the pump-lever raises the water, and the speed of this train of wheels can be regulated by partially shutting off the flow or can be stopped by wholly closing the shut-off cock, and when said train is in motion the two intermediate gear-wheels are disengaged therefrom. In winding the ropes upon the drums the two intermediate gear-wheels are disengaged from the entire mechanism.

When it is desired to have the full power of the machine, the two suspended weights are brought into play, the ropes thereof being wound upon the drums, after which the intermediate gear-wheels are moved on their shafts laterally and are brought in engagement with the five wheels $f\,f'\,g\,g'\,d'$, thus causing every gear-wheel on the frame to engage one another, thereby providing an increased power and speed, which is desirable in case a heavy stream of water is required, or for running saws by applying a common belt to the wheel $p$ and connecting the same to a pulley of a saw or other machinery where power is required.

It will be observed that we construct a power-machine which can be used singly or double, and it is simple in operation and durable as well as cheap to manufacture.

Having thus described our invention, what we claim, and desire to secure by Letters Patent, is—

In a power-machine, the combination of the main gear-wheels mounted in the frame, a train of gear-wheels arranged upon the transverse shafts, the auxiliary train of gearing, the intermediate gear-wheels $o$ $o$, adapted to be connected with or disconnected from the other gears, the levers $m'$ $m'$, the drums on the lower transverse shafts, ropes, and weights, the whole adapted to operate as and for the purpose set forth.

In testimony whereof we affix our signatures in presence of two witnesses.

MYRON GLASSBROOK.
NICHOLAS EMMER.

Witnesses:
FRANK E. BEEMAN,
W. H. McENALLY.